United States Patent
Pogam et al.

(10) Patent No.: US 10,557,409 B2
(45) Date of Patent: Feb. 11, 2020

(54) HEAT ENGINE COMPRISING A SYSTEM FOR VARYING THE COMPRESSION RATIO

(71) Applicant: GOMECSYS B.V., Naarden (NL)

(72) Inventors: Matthieu Pogam, Chatou (FR); Julien Berger, Paris (FR); Lambertus Hendrik De Gooijer, Bussum (NL); Willem-Constant Wagenvoort, Huizen (NL); Sander Wagenaar, Huizen (NL)

(73) Assignee: GOMECSYS B.V., Naarden (NL)

(*) Notice: Subject to any disclaimer, the term of this patent is extended or adjusted under 35 U.S.C. 154(b) by 0 days.

(21) Appl. No.: 15/769,438

(22) PCT Filed: Oct. 3, 2016

(86) PCT No.: PCT/FR2016/052526
§ 371 (c)(1),
(2) Date: Apr. 19, 2018

(87) PCT Pub. No.: WO2017/068258
PCT Pub. Date: Apr. 27, 2017

(65) Prior Publication Data
US 2018/0306107 A1    Oct. 25, 2018

(30) Foreign Application Priority Data
Oct. 22, 2015    (FR) .................................... 15 60087

(51) Int. Cl.
*F02B 75/04* (2006.01)
*F02D 15/02* (2006.01)
(Continued)

(52) U.S. Cl.
CPC ............ *F02B 75/048* (2013.01); *F02D 15/02* (2013.01); *F16C 3/28* (2013.01); *F16H 21/30* (2013.01)

(58) Field of Classification Search
CPC ........ F02B 75/048; F02B 75/04; F16H 21/30; F02D 15/02; F02D 15/00; F16C 3/28
See application file for complete search history.

(56) References Cited

U.S. PATENT DOCUMENTS

| 1,553,009 A | 9/1925 | Stuke |
| 1,767,352 A | 6/1930 | Damblanc |
(Continued)

FOREIGN PATENT DOCUMENTS

| AU | 7857681 A | 6/1982 |
| CN | 102066719 A | 5/2011 |
(Continued)

OTHER PUBLICATIONS

International Search Report dated Jan. 17, 2017 for corresponding International Application PCT/FR2016/052526, filed Oct. 3, 2016.
(Continued)

*Primary Examiner* — Jacob M Amick
(74) *Attorney, Agent, or Firm* — Steven M. Koehler; Westman, Champlin & Koehler

(57) ABSTRACT

A heat engine includes a system for varying the compression ratio of the engine. The compression ratio varying system comprises: at least one eccentric part rotatably mounted on a crank pin. The eccentric part has an eccentric outer face that co-operates with one end of a rod, as well as at least one ring gear. A device for controlling the angular position of the eccentric part, includes an actuating pinion mounted on an actuating shaft. The control device also comprises at least one stepped intermediate pinion having at least first and second steps each formed by a pinion, the pinion of the first step meshing with the actuating pinion and the pinion of the second step meshing with the gear of the eccentric part.

17 Claims, 5 Drawing Sheets

(51) Int. Cl.
*F16C 3/28* (2006.01)
*F16H 21/30* (2006.01)

(56) References Cited

U.S. PATENT DOCUMENTS

| | | | |
|---|---|---|---|
| 2,271,766 A | 2/1942 | Huebotter | |
| 3,686,972 A | 8/1972 | McWhorter | |
| 3,861,239 A | 1/1975 | McWhorter | |
| 4,152,955 A | 5/1979 | McWhorter | |
| 4,237,741 A | 12/1980 | Huf et al. | |
| 4,860,702 A | 8/1989 | Doundoulakis | |
| 5,133,314 A | 7/1992 | Langstroth | |
| 5,170,757 A | 12/1992 | Gamache | |
| 5,482,015 A | 1/1996 | Fish | |
| 5,605,120 A | 2/1997 | Hedelin | |
| 5,611,301 A | 3/1997 | Gillbrand et al. | |
| 5,908,014 A | 6/1999 | Leithinger | |
| 5,927,236 A | 7/1999 | Gonzalez | |
| 6,349,684 B1 | 2/2002 | De Gooijer | |
| 7,185,557 B2 | 3/2007 | Venettozzi | |
| 7,293,542 B2 | 11/2007 | Ozdamar | |
| 8,714,134 B2 | 5/2014 | De Gooijer | |
| 9,279,363 B2 | 3/2016 | De Gooijer | |
| 2003/0183026 A1 | 10/2003 | Korniyenko et al. | |
| 2006/0053964 A1 | 3/2006 | Venettozzi | |
| 2006/0193739 A1 | 8/2006 | Beaudoin | |
| 2009/0133653 A1 | 5/2009 | Duzzie et al. | |
| 2009/0188337 A1 | 7/2009 | Chio | |
| 2011/0036334 A1* | 2/2011 | De Gooijer | F02B 41/04 123/568.14 |
| 2012/0180583 A1 | 7/2012 | De Gooijer | |
| 2014/0360292 A1 | 12/2014 | De Gooijer | |
| 2017/0211471 A1 | 7/2017 | De Gooijer et al. | |

FOREIGN PATENT DOCUMENTS

| | | |
|---|---|---|
| DE | 181913 C | 3/1905 |
| DE | 164819 C | 11/1905 |
| DE | 329861 C | 12/1920 |
| DE | 488059 C | 12/1929 |
| DE | 2947882 A1 | 7/1981 |
| DE | 242077 A5 | 1/1987 |
| DE | 3634536 A1 | 2/1987 |
| DE | 3642681 A1 | 6/1988 |
| DE | 10230425 A1 | 1/2004 |
| DE | 10230426 A1 | 1/2004 |
| DE | 102008032665 A1 | 1/2010 |
| DE | 102011085647 A1 | 5/2013 |
| EP | 0345366 A1 | 12/1989 |
| EP | 1959112 A1 | 8/2008 |
| EP | 2025893 A1 | 2/2009 |
| EP | 2620614 A1 | 7/2013 |
| EP | 2930329 A1 | 10/2015 |
| FR | 861611 A | 2/1941 |
| FR | 986605 A | 8/1951 |
| FR | 1014314 A | 8/1952 |
| FR | 2680402 A1 | 2/1993 |
| GB | 173252 A | 12/1921 |
| GB | 1094649 A | 12/1967 |
| JP | 6113276 | 6/1986 |
| JP | 61187931 | 11/1986 |
| JP | 361135 | 3/1991 |
| JP | 10121981 A | 5/1998 |
| JP | 2002286020 A | 10/2002 |
| JP | 2007113471 A | 5/2007 |
| JP | 2010192271 A | 9/2010 |
| RU | 2296234 C1 | 3/2007 |
| WO | 8607115 A1 | 12/1986 |
| WO | 9627079 A1 | 9/1996 |
| WO | 9745647 A1 | 12/1997 |
| WO | 9963247 A1 | 12/1999 |
| WO | 2002059503 A1 | 8/2002 |
| WO | 2003098005 A1 | 11/2003 |
| WO | 2006004612 A2 | 1/2006 |
| WO | 2008129025 A1 | 10/2008 |
| WO | 2009018863 A1 | 2/2009 |
| WO | 2009100759 A1 | 8/2009 |
| WO | 20090101173 A1 | 8/2009 |
| WO | 2011006537 A1 | 1/2011 |
| WO | 2013110700 A1 | 8/2013 |
| WO | 20130160501 A1 | 10/2013 |

OTHER PUBLICATIONS

Written Opinion of the International Searching Authority dated Jan. 17, 2017, for corresponding International Application PCT/FR2016/052526, filed Oct. 3, 2016.

\* cited by examiner

HEAT ENGINE COMPRISING A SYSTEM FOR VARYING THE COMPRESSION RATIO

CROSS-REFERENCE TO RELATED APPLICATION

The present application is a national stage of International Patent Application Serial No. PCT/FR2016/052526, filed Oct. 3, 2016, and published in French.

BACKGROUND

The present invention relates to a heat engine comprising a system for varying compression ratio of said engine provided with a stepped intermediate pinion.

Document EP14163870.0 teaches to realise a system for varying compression ratio as a function of engine operating conditions. This system for varying compression ratio comprises an assembly of eccentric parts mounted on the crankpins of the crankshaft in a manner that each cooperates with an end of the connecting rod.

A control device 1 shown in FIG. 1 allows to control the position of the eccentric parts 2. For this purpose, the control device 1 comprises an actuating shaft 3 and a cascade of pinions formed by an actuating pinion 4 attached to the actuating shaft 3, and intermediate pinions 5 of which one portion mesh with the actuating pinion 4 and the other portion with a gear 6 that is attached to the eccentric part 2.

During operation and when the actuating shaft 3 is rotationally fixed with respect to the frame, the system has a configuration at fixed compression ratio. Upon changing compression ratio, the angular position of the eccentric part 2 is controlled by the angular position of the actuating shaft 3 so as to move to a new compression ratio. For this purpose, through the pivots of the crankshaft, the shafts and so-called transfer gears transmit the kinematics of the eccentric part 2 located on the side of the actuating shaft 3 from one to the other towards all the other eccentric parts 2 of the crankshaft (not visible in FIG. 1).

However, the problem of such a configuration is that the shift of the gear planes between firstly the actuating pinion 4 and the intermediate pinions 5 and secondly between the intermediate pinions 5 and the gear 6 requires digging a flange of the crankshaft to integrate the actuating pinion 4 and a portion of the intermediate pinions 5, which locally weakens the crankshaft.

In addition, the balancing of the crankshaft may require reduction of the opposite flange, which also tends to reduce the mechanical strength of the crankshaft. Machining the recess or recesses in the flange also results in a significant machining time that can generate many chips.

SUMMARY

The invention aims to effectively remedy these drawbacks by proposing a heat engine, in particular of a motor vehicle, comprising a system for varying compression ratio of said engine, wherein said system for varying compression ratio comprises:
- at least an eccentric part which is rotatably mounted on a crankshaft crankpin, wherein said eccentric part comprises an external face including an eccentric shape which is intended to cooperate with an end of a connecting rod, as well as at least a gear,
- a control device for controlling the rotational position of said eccentric part which comprises an actuating pinion which is mounted on an actuating shaft, wherein said control device further comprises at least a stepped intermediate pinion, which comprises at least a first and a second stage that are each formed by a pinion, wherein the pinion of said first stage meshes with said actuating pinion and the pinion of said second stage meshes with said gear of the eccentric part.

The invention thus makes it possible to reduce the size of the recesses made in the flange of the crankshaft to receive the pinions. This improves the mechanical strength of the crankshaft and thus the achievable level of performance of the engine while facilitating the balancing of the crankshaft. The machining time of the crankshaft is also reduced, which makes it possible to reduce the chips and thus optimize the machining process. In some cases, the actuating pinion and/or the pinion of one of the stages may have a tooth configuration which is identical to that of the transfer pinions to limit the production cost of the system.

In one embodiment, the internal combustion engine also comprises a crankshaft, and said control device preferably passes through the crank arm.

Preferably, the two stages that are each formed by a pinion (37, 38) are located at the same side of the crank arm.

In one embodiment the pinion of said first stage has a diameter which is smaller than the diameter of the pinion of said second stage. This makes it possible to reduce a diameter of the corresponding actuating pinion and thus to reduce the size of the system.

In one embodiment, the pinion of said first stage comprises less teeth than the pinion of said second stage.

In one embodiment said pinions of said first and second stages have substantially the same axial thickness with respect to each other.

In one embodiment, said pinions of said first and second stages are assembled together by shrinking and/or screwing and/or welding and/or gluing and/or snapping and/or putting in cooperation with splines of said pinions.

In one embodiment, said pinions of said first and second stages are located at either side of a support plate.

In one embodiment, said support plate comprises fixation means for being attached on a crankshaft flange.

In one embodiment, said pinions of said first and second stages are rotationally guided with respect to said support plate via a bearing, such as a type of needle bearing.

In one embodiment, said actuating pinion is rotationally mounted on a pin projecting from said support plate.

In one embodiment, a gear ratio between said actuating gear and said gear of the eccentric part is substantially equal to 0.5. This makes it possible to guarantee a rotation of the eccentric part at half speed with respect to the rotational speed of the crankshaft.

BRIEF DESCRIPTION OF THE DRAWINGS

Aspects of the invention will be better understood on reading the following description and on examining the accompanying figures. These figures are only given for illustrative reasons, but they are not limiting the invention.

FIG. 1, as already described, is a perspective view of intermediate pinions according to the prior art, each having two meshing planes with the actuating pinion and the gear of the eccentric part, respectively, while

FIG. 4 is a perspective view of the portion of the system for varying the compression ratio incorporating a stepped intermediate gear, while

DETAILED DESCRIPTION

Figure 1:
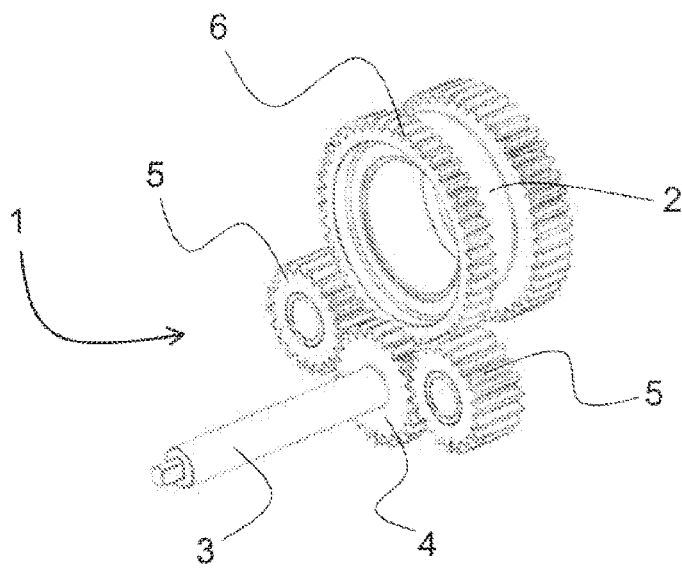
Figure 1A:
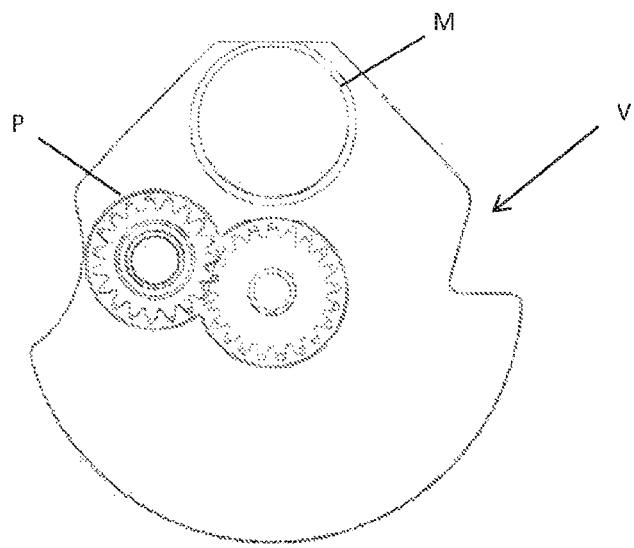
FIG. 1a is an end view of a crankshaft according to the prior art.
Figure 4A:
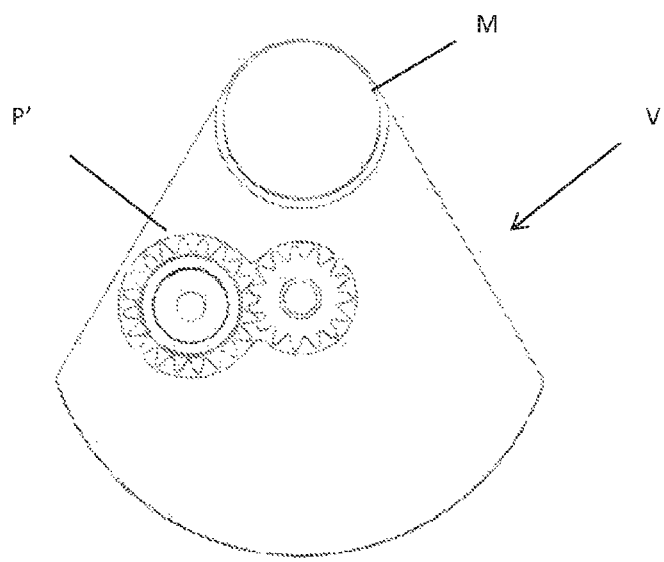
FIG. 4a is an end view of a crankshaft.
Figure 4:
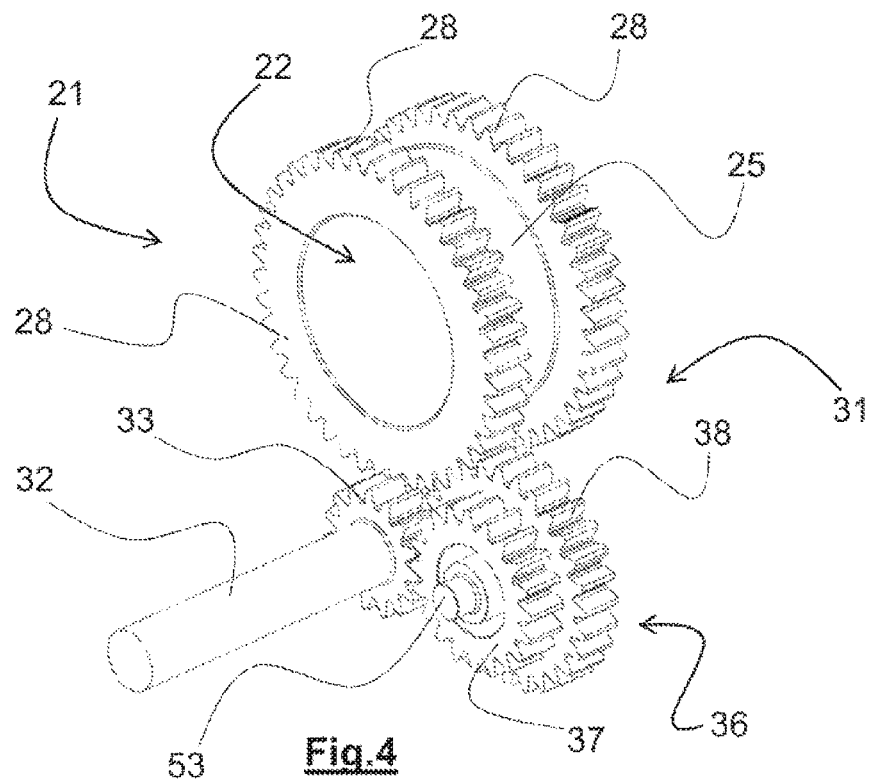

FIGS. 1a and 4a show views of the crankshaft with the non-stepped intermediate pinions without step according to the prior art shown in FIG. 1, and with the stepped gears according to the invention shown in FIG. 4, respectively.

In FIGS. 2 to 8, identical, similar, or analogous elements, retain the same reference from one figure to another.

Figure 2:
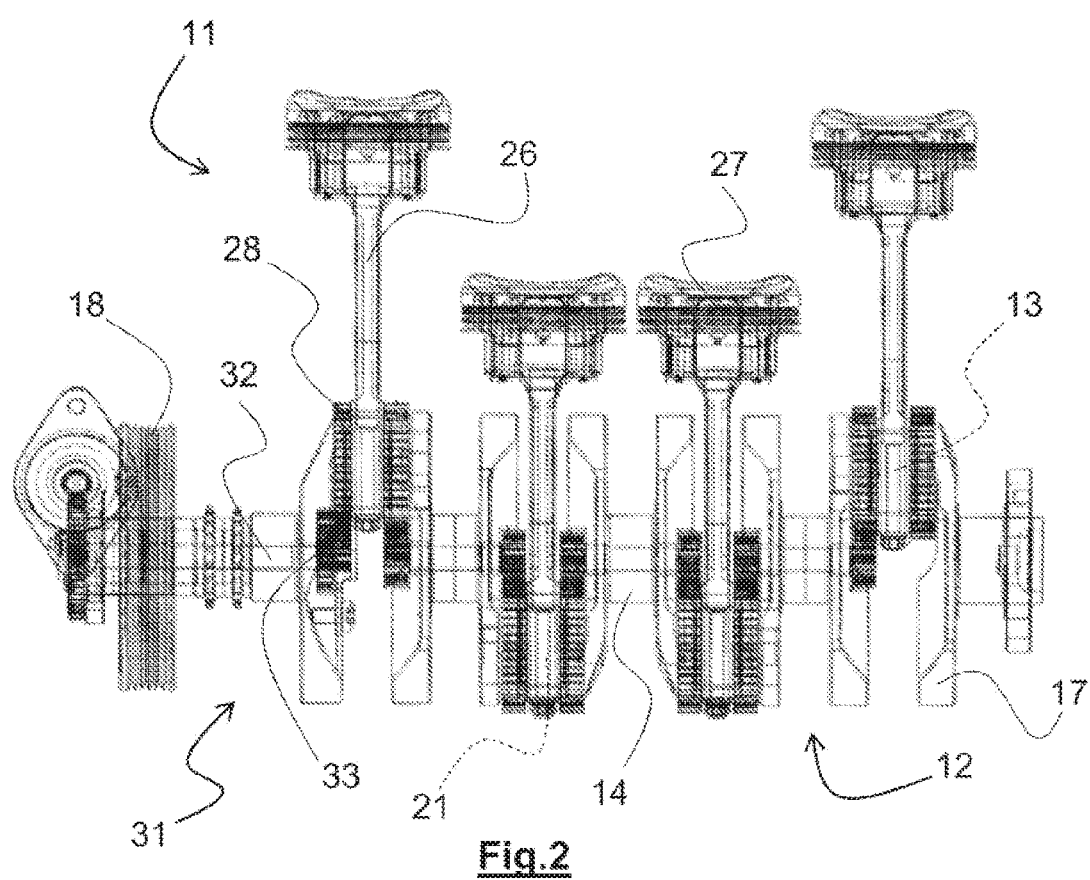
FIG. 2 is a side view illustrating the integration of the system for varying the compression ratio of a heat engine along the entire length of the crankshaft.

FIG. 2 is a side view of a crankshaft 12 incorporating a system 11 for varying the compression ratio to vary the compression ratio as a function of the operating conditions of the engine. This makes the system 11 possible to operate an internal combustion engine at a high compression ratio under low load conditions in order to improve its efficiency. Under high load operating conditions, the compression ratio can be decreased to avoid jolts.

More specifically, the engine crankshaft 12 with axis X is intended to be rotatably mounted on a crankcase by means of bearings. The crankshaft 12 comprises a plurality of crankpins 13, and journals 14, separated by flanges 17 extending substantially perpendicular to the axis X. The crankshaft 12 further has a front end intended to be attached in rotational direction with a pulley 18. A flywheel (not shown) is attached in rotatable direction to the rear end of the crankshaft 12.

Eccentric parts 21 are rotatably mounted on the crankpins 13 via a through-hole 22 made in each eccentric part 21. As can be seen more clearly in FIG. 4, each eccentric part 21 comprises an external face 25 of eccentric shape with respect to the axis of the hole 22 and therefore to the corresponding crankpin 13. The outer face 25 is intended to cooperate with a big end of a connecting rod 26, which has its small end rotatably connected to a piston 27 of the engine. Each eccentric part 21 also comprises two gears 28 located at either side of the outer face 25.

Figure 3:
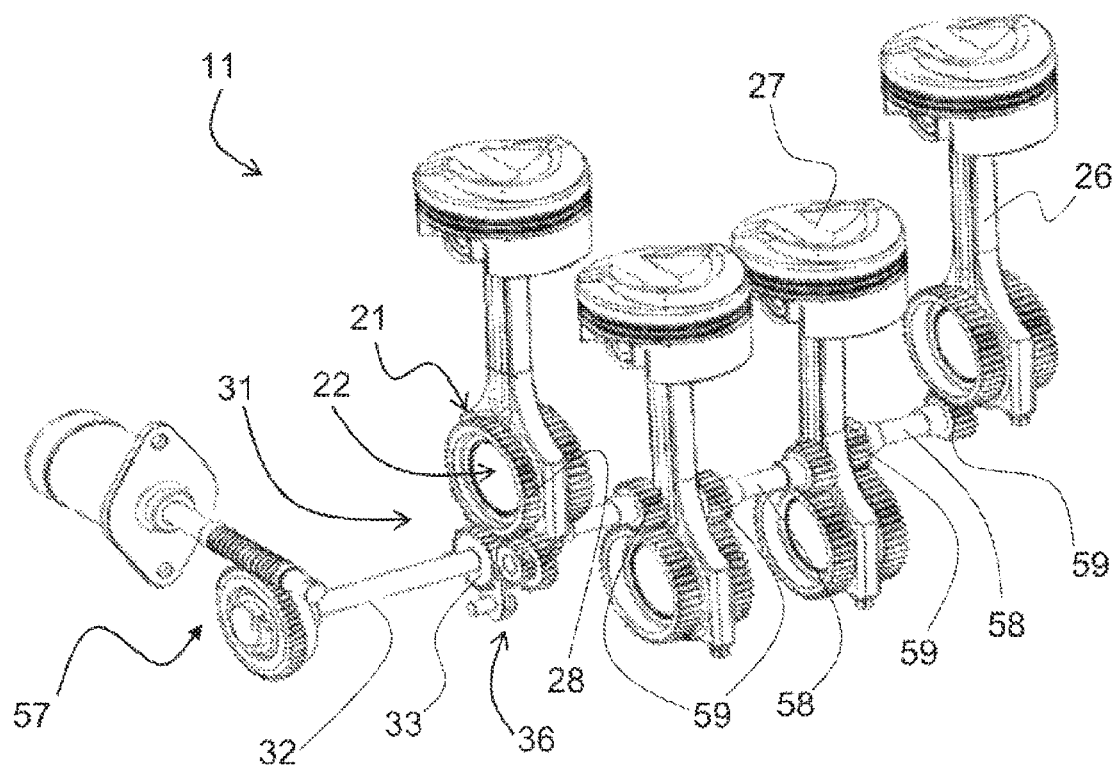
FIG. 3 is a perspective view of the system for varying the compression ratio of a heat engine without the crankshaft.

A control device 31 which is clearly visible in FIG. 3 makes it possible to adjust the angular position of the eccentric parts 21. For this purpose, the control device 31 comprises an actuating shaft 32 and a cascade of pinions constituted by an actuating pinion 33 mounted on the actuating shaft 32, and a stepped intermediate pinion 36. This intermediate pinion 36 comprises a first and a second stage, each formed by a pinion 37, 38, respectively. The pinion 37 of the first stage meshes with the actuating pinion 33 and the pinion 38 of the second stage meshes with a gear 28. The pinions 37 and 38 are coaxial. It is also possible to use two or more intermediate pinions. It depends on the application.

In order to allow a reduction in the diameter of the actuating pinion 33 and thus a reduction in the size of the assembly, the pinion 37 of the first stage has a smaller diameter than the diameter of the pinion 38 of the second stage. In addition, the pinion 37 of the first stage has less teeth than the pinion 38 of the second stage.

The pinions 37, 38 of the first and second stages have substantially the same axial thickness with respect to each other. This thickness corresponds substantially to half the thickness of an intermediate pinion of the prior art.

Figure 5:
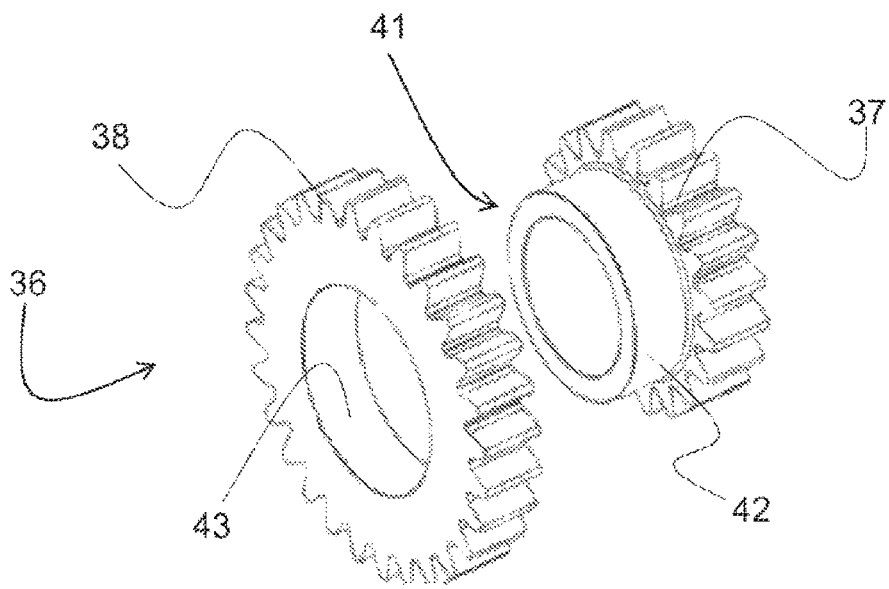
FIG. 5 is an exploded view of a stepped intermediate gear.

As can be seen in FIG. 5, to ensure assembly of the pinions 37, 38 together, one of the two pinions, here the pinion 37 comprises a sleeve 41 including a central hole to allow passage of a shaft. This sleeve 41 projects in axial direction from an end face of the annular portion that carries the teeth of the pinion 37.

The two sprockets 37, 38 may be assembled by shrinking and/or screwing between the external axial cylindrical face 42 of the sleeve 41 and the internal axial cylindrical face 43 of the annular toothed portion of the pinion 38. The faces 42, 43 may also be welded or glued together by a welding zone and/or gluing zone extending continuously along the entire periphery or via a few points of equidistant welds. It is also possible to provide grooves (fretted or not) of complementary shape arranged in the faces 42, 43 of the pinions 37, 38. A snap-fit assembly of the pinions 37, 38 is also conceivable. Alternatively, the assembly is reversed, that is to say that the pinion 38 comprises the sleeve 41 that penetrates inside the central opening of the pinion 37.

In the embodiment of FIGS. 7a to 8b, the pinions 37 and 38 are located on either side of a support plate 46. The support plate 46 comprises fixing means 47 to be fixed on a flange 17 of the crankshaft, so that at least a portion of at least one of the gears, in this case the pinion 37 (see FIG. 8b) and a portion of the plate 46 is housed in a recess in the flange 17. In this case, these fixing means 47 comprise two screws 48 passing through holes made in a flange 49 of the plate 46 intended to cooperate with corresponding threaded bores formed in the thickness of the flange 17 (see FIG. 8a), such that a third screw 48 passes through an opening made on the side of an opposite end of the plate 46 and intended to cooperate with a threaded bore made in a transverse face of the flange 17. Alternatively, the screws 48 may be replaced by rivets or pins, or any other means of attachment adapted to the application.

Figure 8A:
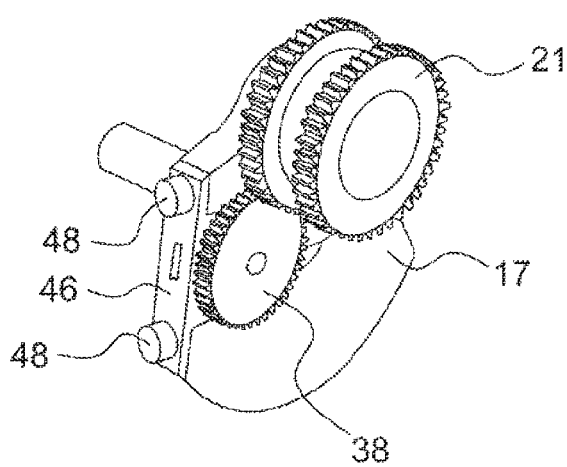
FIGS. 8a and 8b are a perspective view and a perspective partial sectional view, respectively, illustrating mounting of the support plate of FIGS. 7a and 7b on a flange of the crankshaft.
Figure 8B:
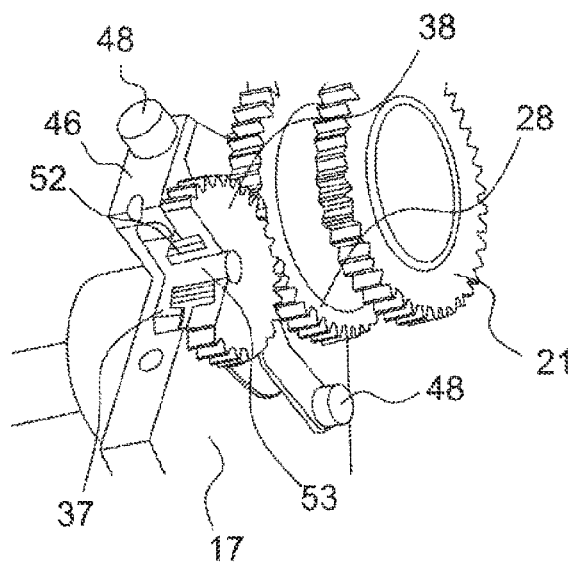

The pinions 37 and 38 are rotationally guided with respect to the support plate 46 via a bearing 52, such as a needle-type bearing which is visible in FIG. 8b. For this purpose, the needle bearing 52 is mounted on a shaft 53 which passes through an opening made in the support plate 46.

Figure 7A:
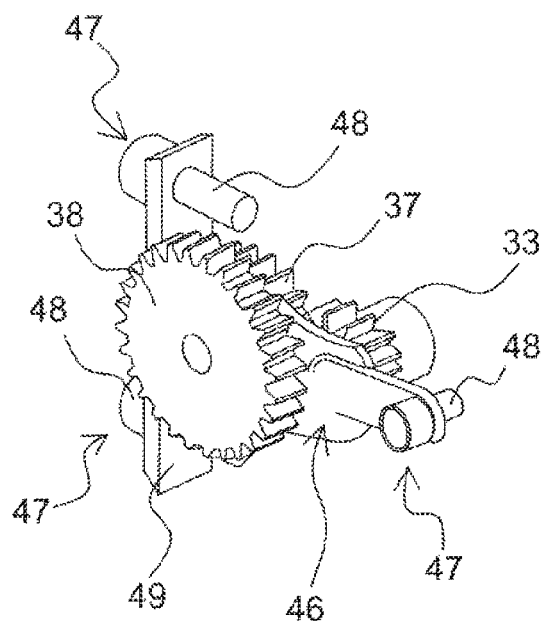
FIGS. 7a and 7b are perspective views illustrating the mounting of a stepped intermediate gear on a support plate.
Figure 7B:
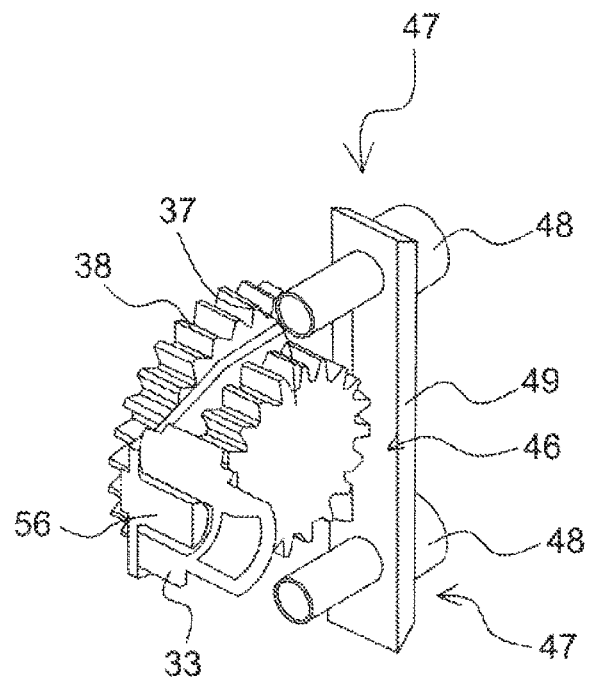

As shown in FIG. 7b, the actuating pinion 33 is rotatably mounted on a pin 56 projecting from the support plate 46. The pin 56 may be attached to or made of one material with the support plate 46. This ensures guiding of the shaft 32 and the actuating pinion 33. The actuating pinion 33 meshes with the pinion 37 on one side of the support plate 46, while the pinion 38 meshes with the gear 28 of an eccentric part 21 on the other side of the support plate 46 (see FIGS. 7b and 8a).

In operation and when the actuating shaft 32 is rotationally fixed with respect to the crankcase, the system has a configuration of fixed compression ratio. Upon changing compression ratio, the angular position of the eccentric part 21 located on the side of the pulley 18 is controlled by the angular position of the actuating shaft 32 so as to change to a new compression ratio. For this purpose, the actuating shaft 32 may be actuated for example by means of a wheel and worm gear 57 (see FIG. 3), or any other means for moving the adapted shaft.

A gear ratio between the actuating pinion 33 and the gear 28 of the eccentric part is substantially equal to 0.5. This ensures a rotation of the eccentric part 21 at half speed with respect to the rotational speed of the crankshaft.

In addition, as illustrated in FIG. 3, through the journals 14 of the crankshaft 12, shafts 58 and so-called transfer pinions 59 transmit the same kinematics of the eccentric part located on the side of the actuating shaft 32 step by step on all the other eccentric parts of the crankshaft 12. To this end, the pinions 59 mounted on the shafts 58 mesh with the gears 28 of the other eccentric parts.

Figure 6:
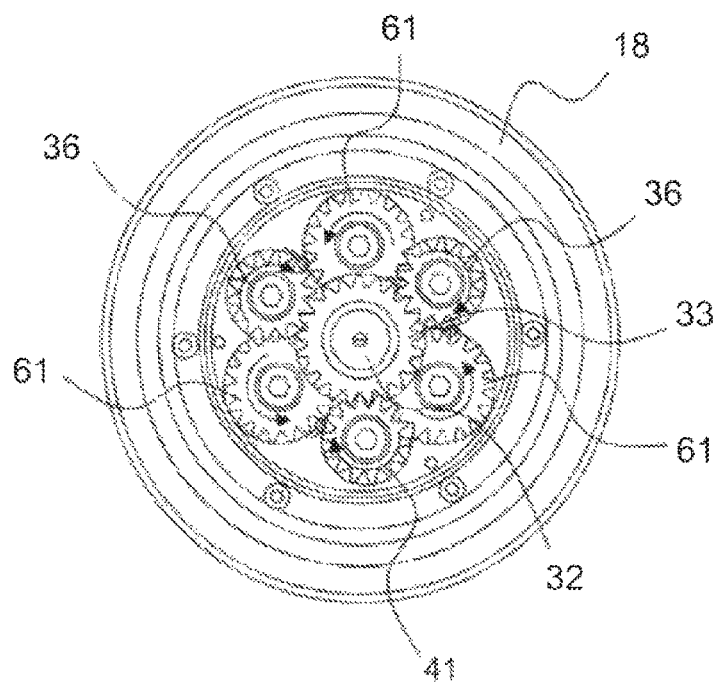
FIG. 6 is a schematic front view of a system for varying the compression ratio of a heat engine made according to a variant of the present invention.

In a variant, as illustrated by FIG. 6, the invention may also be implemented in a so-called "cassette" epicyclic gear arrangement integrated inside or in the vicinity of the accessory crankshaft pulley 18. In this case, an assembly of stepped intermediate pinions 36 each mesh with the actuating pinion 33, on the one hand, and with a satellite pinion 61 reversing the direction of rotation, on the other hand. Each satellite pinion 61 also meshes with a transfer pinion 59.

FIGS. 1a and 4a demonstrate an important advantage provided by the invention:—FIG. 1a shows, according to the prior art, the crankshaft V in which is dug a pocket P which houses the non-stepped intermediate pinion. This pocket is close to the crankpin M.—in FIG. 4a, according to the invention, the crankshaft has a pocket P' which has smaller dimensions, because of the stepping of the intermediate pinion. In addition, it is noted that this pocket is further away from the crankpin: not only the pocket P' (the cavity) is smaller, but in addition it is further away from the region of vicinity of the crankpin, which is an important region in terms of mechanical strength, where it is important to keep a sufficient thickness to precisely ensure the mechanical strength of the part.

Due to the stepping of the intermediate pinion in two new intermediate pinions 36, 37, it is possible to reduce the number of teeth of the actuating pinion 33. For example: the intermediate pinion 36 meshes with the eccentric by 28 teeth and the intermediate pinion 37 meshes with the actuating pinion by 20 teeth: only 15 teeth are required for the actuating pinion 33 in order to make the kinematics of ratio 0.5 between actuation and eccentric. The number of teeth of the intermediate pinion does not have any impact on the kinematics, the actuating pinion is thus reduced in size (diameter), the pocket on the crankshaft is also reduced, which limits the impact on the strength of this crank arm.

In the case of the comparative example without stepping (FIGS. 1 and 1a), for example if the eccentric 2 has 42 teeth, with a non-stepped intermediate pinion 5, the actuating pinion 4 must, on the contrary, necessarily have 21 teeth so as to have a ratio of 0.5 between actuation and eccentric.

The invention claimed is:

1. A heat engine including a system configured to vary a compression ratio of said engine, said system comprising:
   a crankshaft having a crankshaft crankpin supported on a crank arm,
      at least an eccentric part which is rotatably mounted on the crankshaft crankpin, wherein said eccentric part comprises an external face including an eccentric shape which is intended to cooperate with an end of a connecting rod, as well as at least a gear,
      a control device configured to control a rotational position of said eccentric part which comprises an actuating pinion which is mounted on an actuating shaft that passes through the crank arm, wherein said control device further comprises at least a stepped intermediate pinion, which comprises at least a first and a second stage that are each formed by a pinion, wherein the pinion of said first stage meshes with said actuating pinion and the pinion of said second stage meshes with said gear of the eccentric part.

2. The heat engine according to claim 1 and wherein the pinions of the first and second stages are located at a same side of the crank arm.

3. The heat engine according to claim 1 and wherein the pinion of said first stage has a diameter which is smaller than a diameter of the pinion of said second stage.

4. The heat engine according to claim 1 wherein the pinion of said first stage comprises less teeth than the pinion of said second stage.

5. The heat engine according to claim 1 wherein said pinions of said first and second stages have substantially a same axial thickness with respect to each other.

6. The heat engine according to claim 1 wherein said pinions of said first and second stages are assembled together by shrinking.

7. The heat engine according to claim 1 wherein said pinions of said first and second stages are located at either side of a support plate.

8. The heat engine according to claim 7 wherein said support plate comprises a fastener configured to attach the support plate on a crankshaft flange.

9. The heat engine according to claim 7, wherein said pinions of said first and second stages are rotationally guided with respect to said support plate via a bearing.

10. The heat engine according to claim 7 wherein said actuating pinion is rotationally mounted on a pin projecting from said support plate.

11. The heat engine according to claim 7 wherein a gear ratio between said actuating pinion and said gear of the eccentric part is substantially equal to 0.5.

12. The heat engine according to claim 1 wherein said pinions of said first and second stages are assembled together by screwing.

13. The heat engine according to claim 1 wherein said pinions of said first and second stages are assembled together by welding.

14. The heat engine according to claim 1 wherein said pinions of said first and second stages are assembled together by shrinking and/or screwing and/or welding and/or gluing and/or snapping and/or put in cooperation with splines of said pinions.

15. The heat engine according to claim 1 wherein said pinions of said first and second stages are assembled together by gluing.

16. The heat engine according to claim 1 wherein said pinions of said first and second stages are assembled together by snapping.

17. The heat engine according to claim 1 wherein said pinions of said first and second stages are assembled together by being put in cooperation with splines of said pinions.

* * * * *